US010165124B2

(12) United States Patent
Mandalia et al.

(10) Patent No.: US 10,165,124 B2
(45) Date of Patent: Dec. 25, 2018

(54) TRANSFER OF VOICE TRANSMISSIONS TO ALTERNATE NETWORKS

(71) Applicant: International Business Machines Corporation, Armonk, NY (US)

(72) Inventors: Baiju D. Mandalia, Boca Raton, FL (US); Trung V. Nguyen, Richmond, TX (US); Aleksas J. Vitenas, Tinton Falls, NJ (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 14/841,866

(22) Filed: Sep. 1, 2015

(65) Prior Publication Data
US 2017/0064086 A1 Mar. 2, 2017

(51) Int. Cl.
H04L 12/58 (2006.01)
H04M 7/00 (2006.01)
H04L 29/06 (2006.01)

(52) U.S. Cl.
CPC ...... H04M 7/0066 (2013.01); H04L 65/1026 (2013.01); H04L 65/1036 (2013.01); H04L 65/1053 (2013.01); H04L 65/1069 (2013.01); H04L 65/80 (2013.01)

(58) Field of Classification Search
CPC .................................................. H04L 65/80
See application file for complete search history.

(56) References Cited

U.S. PATENT DOCUMENTS

| 8,125,888 | B2 | 2/2012 | Kandikonda et al. |
| 8,195,160 | B2 | 6/2012 | Gallagher et al. |
| 8,369,311 | B1 | 2/2013 | Kirchhoff et al. |
| 2013/0003720 | A1* | 1/2013 | Tasker ................ H04L 65/1069 370/352 |

(Continued)

OTHER PUBLICATIONS

Internet Society Requests for Comment (RFCS) et al., "Secure Telephone Identity Problem Statement and Requirements (RFC7340)", An IP.com Prior Art Database Technical Disclosure, IP.com No. 000238894, Original Publication Date: Sep. 1, 2014, IP.com Electronic Publication Date: Sep. 24, 2014, Copyright (c) 2014 IETF Trust and the persons identified as the, pp. 1-51, <http://null/IPCOM/000238894>.

(Continued)

Primary Examiner — Zewdu A Beyen
(74) Attorney, Agent, or Firm — Daniel R. Simek

(57) ABSTRACT

Automatically transferring transmissions of a data network in which one or more processors receive metrics of active concurrent transmission sessions on a LAN that includes a data network, connected to a WAN, and a threshold level of concurrent transmission sessions of the data network of the LAN. Receiving a request for an additional transmission session, and responsive to determining that the threshold level of concurrent transmission sessions is exceeded, accessing data that maps a communication connection of the data network for a targeted recipient, to a communication connection of an alternate network corresponding to the targeted recipient, and performing a transfer of the additional transmission session from the communication connection of the data network for the targeted recipient, to the alternate network corresponding to the targeted recipient.

19 Claims, 4 Drawing Sheets

(56) References Cited

U.S. PATENT DOCUMENTS

2016/0127480 A1* 5/2016 Rose ................ H04L 67/16
　　　　　　　　　　　　　　　　　　　709/219

OTHER PUBLICATIONS

Internet Society Requests for Comment (RFCS) et al., "SIP Telephony Device Requirements and Configuration (RFC4504)", An IP.com Prior Art Database Technical Disclosure, Original Publication Date: May 1, 2006, IP.com No. 000136627, IP.com Electronic Publication Date: May 25, 2006, Copyright (C) The Internet Society (2006), pp. 1-39, <http://null/IPCOM/000136627>.

Siemens et al., "Support of Real-time Applications over Long Thin Networks", An IP.com Prior Art Database Technical Disclosure, Original Publication Date: Jun. 18, 2007; IP.com No. 000153151, IP.com Electronic Publication Date: May 25, 2007, Copyright: Nokia Siemens Networks 2007, pp. 1-8, <http://null/IPCOM/000153151>.

Vali et al., "An Efficient Micro-Mobility Solution for SIP Networks", GLOBECOM 2003, pp. 3088-3092, © 2003 IEEE.

* cited by examiner

| ROUTER TABLE | LOCATION | LOCATION | LOCATION |
|---|---|---|---|
| BANDWIDTH | 1.5 MB/s | 1.5 MB/s | 1.0 MB/s |
| CSM | 15 | 15 | 10 |
| CSA | 7 | 14 | 10 |

FIG. 2A

| USER | EXTENSION | MOBILE | PSTN |
|---|---|---|---|
| FIRST USER | X-3398 | 987-654-0123 | 7-987-565-0001 |
| SECOND USER | X-3388 | 987-456-3210 | 7-987-565-0002 |
| THIRD USER | X-3365 | 987-564-1122 | 7-987-565-0003 |

FIG. 2B

TRANSFER OF VOICE TRANSMISSIONS TO ALTERNATE NETWORKS

FIELD OF THE INVENTION

The present invention relates generally to the field of concurrent IP telephonic capacity, and more particularly to redirection of over-capacity transmissions to a mobile device.

BACKGROUND OF THE INVENTION

Transitioning from traditional time-division multiplexing (TDM) trunks to voice over IP (VoIP) centralized session initiation protocol (SIP) telephony services provides many enterprise organizations significant savings. The SIP is a communications protocol for signaling and controlling multimedia communication sessions. The most common applications of SIP are in Internet telephony for voice and video calls, as well as instant messaging, all over Internet Protocol (IP) networks. Voice transmission of telephony using IP networks is referred to as voice over internet protocol, or voice over IP (VoIP). TDM is a method of transmitting and receiving independent signals over a common signal path by means of synchronized switches at each end of the transmission line so that each signal appears on the line only a fraction of time in an alternating pattern.

A limitation of this transition is the use of the data network at each location to carry voice (or video) transmissions, adding to the bandwidth of transmissions. There is a limit to the number of concurrent voice transmissions that can be carried on the local and wide area data networks, based on the bandwidth at each location when the IP data service provided includes quality of service (QoS) based multi-protocol label switching (MPLS) networks. MPLS is a scalable, protocol-independent transport, often chosen for reliability purposes, in which data packets are assigned labels. Packet-forwarding decisions are made solely on the contents of this label, without the need to examine the packet itself.

Configurations for enterprise-level data and voice transmissions often have a capacity limitation at each of a plurality of locations, for example a consulting business may have multiple branch locations as well as a headquarters location. Each branch location may have a designated number (fixed limit) of concurrent voice transmissions assigned as a threshold limit, based on the number of employees at each location. Extra capacity may be assigned to accommodate peak periods, but the extra capacity may go unused for a majority of time. Alternatively, without establishing extra capacity, peak voice transmission periods may experience loss of service.

SUMMARY

Embodiments of the present invention disclose a method, computer program product, and system for automatically transferring transmissions of a data network. The method for automatically transferring transmissions of a data network provides that one or more processors receive metrics of active concurrent transmission sessions on a local area network (LAN) that includes a data network, connected to a wide area network, and a threshold level of concurrent transmission sessions of the data network of the LAN. One or more processors receive a request for an additional transmission session on the data network of the LAN. Responsive to determining that the additional transmission session results in active concurrent sessions that exceed the threshold level of concurrent transmission sessions, one or more processors accessing data that maps a communication connection of the data network for a targeted recipient, to a communication connection of an alternate network corresponding to the targeted recipient, and one or more processors performing a transfer of the additional transmission session from the communication connection of the data network for the targeted recipient, to the alternate network corresponding to the targeted recipient.

BRIEF DESCRIPTION OF THE SEVERAL VIEWS OF THE DRAWINGS

FIG. 2A illustrates an exemplary communication bandwidth capacity and current activity table of a first branch of distributed communication network environment 100 of FIG. 1, in accordance with an embodiment of the present invention.

FIG. 2B illustrates an exemplary table that includes telephony contact translation information of selected users of the distributed communication network environment of FIG. 1, in accordance with an embodiment of the present invention.

DETAILED DESCRIPTION

Figure 1:
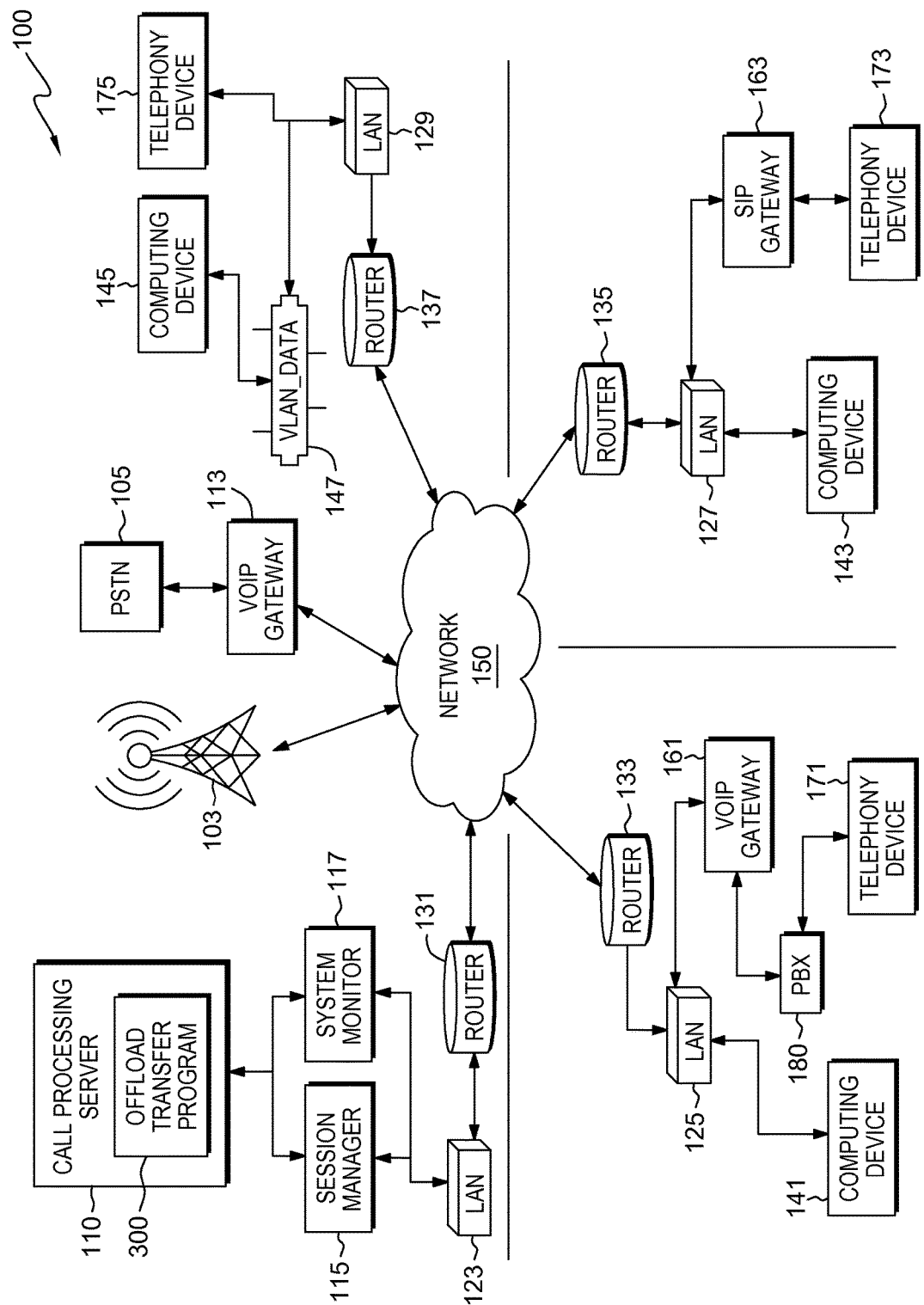
FIG. 1 is a functional block diagram illustrating a distributed communication network environment, in accordance with an embodiment of the present invention.

Embodiments of the present invention recognize that communication systems that convert to, or incorporate SIP over VoIP for voice and/or video transmission, from traditional TDM trunks, make use of data networks to carry voice and/or video transmissions. Due to bandwidth capacity of the local communication system, voice and/or video transmissions (hereafter referred to as "voice", or "voice transmissions"), have a predefined capacity limit of concurrent transmission to meet service provider quality of service (QoS) level agreements for MPLS networks. Voice transmissions that are received or initiated in excess of a capacity limit, which may occur at peak usage periods, experience a loss of service or unavailability of service.

For example, a local branch of an enterprise-level business holds a weekly conference call to provide information and receive input from all employees of the local branch. The call requires every employee to be on a voice transmission call concurrently (assuming limited sharing of voice transmission calls; however, establishing the capacity limit of the network to accommodate the weekly call requires paying for capacity levels that go unused for over ninety percent of the work-week. Lowering the capacity limit will result in loss of service for some employee calls.

Embodiments of the present invention provide a method, computer program product, and computer system that determines a concurrent voice transmission level reaching the capacity limit of a local network, and provides an automated transfer of the additional voice transmission to a mobile communication device corresponding to the target user. In some embodiments of the present invention a translation reference file is maintained in which the VoIP telephone numbers are mapped to a corresponding mobile communication device telephone number, which enables transfer of a telephonic transmission to the mobile device over a cellular network, which is a type of an alternate network, in response to the concurrent voice transmission level of the local network reaching or exceeding the capacity limit. Use of an alternate network to complete the connection of the transmission avoids a loss of service response from attempting to access the at-capacity data network. In some embodiments, mapping the translation reference file may also include public switched telephone network (PSTN) telephone numbers that may be used to offload voice calls exceeding SIP network capacity. In some embodiments, the transfer of the telephonic transmission, either incoming or outgoing, uses a mobile phone communication network, separate from the local data network, and avoids exceeding the capacity limit of concurrent voice transmissions. For an out-going voice transmission, as a user places an outbound call, and if the capacity of the branch location is detected to be at a threshold limit, a call back to the user's mobile phone is performed to establish a call with the other party over the mobile network, or PSTN network. Use of the PSTN network may require modification to the handshaking protocol. The threshold limit may be established by the QoS or other aspect of a service level agreement (SLA) of the service provider, and the threshold limit of active concurrent connections supported by a service provider is often referred to as a concurrent session maximum (CSM).

Some embodiments of the present invention include combinations of the following features: an edge function within edge devices, such as routers, to monitor concurrent voice sessions and threshold capacity of branch locations; a central monitoring system (system monitor) for collection of concurrent voice transmission session metrics; call processor communication with central monitoring to access concurrent voice transmission session metrics and threshold capacities of branch locations; a data structure that includes VoIP telephone extension data by branch location, and mobile phone numbers that map to the VoIP telephone extensions of each branch location; a lower-quality SLA as an alternative to direct voice calls exceeding bandwidth capacity, based on an edge monitoring trigger, to degraded codec, broadband, and Wi-Fi, based on edge monitoring trigger. Use of degraded codec uses less bandwidth on the same MPLS, with lower voice quality, which potentially enables additional sessions to be processed within the assigned bandwidth limit for the specific MPLS connection. Use of broadband Internet, instead of MPLS serves as an alternative network, but lacks quality of service (QoS) attributes of MPLS. Wi-Fi networks operate as an alternative parallel network within LANs for the broadband traffic.

The present invention will now be described in detail with reference to the Figures (FIG.). FIG. 1 is a functional block diagram illustrating a distributed communication network environment, in accordance with an embodiment of the present invention.

In an exemplary embodiment of the present invention, distributed communication network environment 100 includes network connections between local branches of an enterprise organization, in which voice communication is transmitted as VoIP via a data network of LANs and a WAN. Distributed communication network environment 100 includes mobile communications network 103, PSTN 105, VoIP Gateways 113 and 161, call processing server 110, session manager 115, system monitor 117, computing devices 141, 143, and 145, virtual local area network_data (VLAN_data) 147, telephony devices 171, 173, and 175, SIP gateway 163, PBX 180, LANs 123, 125, 127, and 129, routers 131, 133, 135, and 137, all interconnected via network 150.

Network 150 can be, for example, a local area network (LAN) connecting other LANs, a telecommunications network, a wide area network (WAN), such as the Internet, a virtual local area network (VLAN), or any combination that can include wired, wireless, or optical connections. In general, network 150 can be any combination of connections and protocols that will support communications between routers 131, 133, 135, and 137, VOIP gateway 113, and mobile communications network 103. Network 150 also provides access to system and network resources for call processing server 110, offload transfer program 300, session manager 115, and system monitor 117, in accordance with embodiments of the present invention.

Computing devices 141, 143, and 145 are connected to network 150 through LANs 125, 127, and 129, respectively, at their respective branch locations. Each branch location may include a plurality of computing devices similarly connected to network 150 through the respective LANs. Computing devices 141, 143, and 145 may be a laptop computer, a tablet computer, a netbook computer, a personal computer (PC), a desktop computer, a personal digital assistant (PDA), a smart phone, or any programmable electronic device capable of connecting to and sending and receiving data via network 150. In another embodiment, computing devices 141, 143, and 145 each represent a computing system utilizing clustered computers and components (e.g., database server computers, application server computers, etc.) that act as a single pool of seamless resources when accessed within distributed communication processing environment 100. Computing devices 141, 143, and 145 may include internal and external hardware components, as depicted and described with reference to FIG. 4.

Mobile communications network 103 and PSTN 105 represent communications networks connected to, but distinct from network 150 and LANs 123, 125, 127, and 129 of the local branch locations of distributed communication network environment 100. Mobile communications network 103 includes support for voice and data transmissions to mobile communication devices (hereafter generically referred to as "mobile phones"), which, in some embodiments of the present invention, receive voice transmissions, also referred to herein as "calls", transferred from local branch VoIP SIP networks. The transfer prevents a loss of service occurring as concurrent calls reach capacity limits of local MPLS networks. PSTN is a switched telephonic network and similarly, in some embodiments of the present invention, voice transmissions may be transferred from VoIP SIP network calls to an available PSTN network as concurrent calls reach capacity limits of local networks.

VoIP gateway 113, VoIP gateway 161, and SIP gateway 163, are electronic devices that enable direct connection of local networks to an Internet telephony service provider (ITSP), extending voice over IP (VoIP) telephonic transmissions beyond the firewall of a LAN. VoIP gateway 113 enables a connection between a legacy telephony network, such as a PSTN primary rate interface (PRI) trunk and a modern VoIP connection using SIP. VoIP gateway 161 enables a connection between a private branch exchange (PBX) telephony system and a VoIP system using SIP. A PBX is a private telephone network used within a business or organizational entity, in which users of the PBX phone system share a number of outside lines for making external phone calls. The VoIP SIP systems utilize data networks for voice and data transmission, and a capacity limit of concurrent voice transmissions on data networks is typically established, for both quality of service and cost reasons.

Telephony devices 171, 173, and 175 send and receive voice transmissions within their respective local branch locations, via connection from respective LANs to network 150. Telephony device 171 is connected to private branch exchange (PBX) 180, and enables a direct connection between the TDM PBX system and SIP-based service providers (not shown), by way of connections to LAN 125, router 133 and network 150. Telephony device 173 is connected to SIP gateway 163, which enables telephony device 173 to utilize SIP VoIP from service providers, by connection to LAN 127, router 135, and network 150. Telephony device 175 supports SIP and VoIP, and is connected directly to LAN 129 which connects to network 150 via router 137. In some embodiments of the present invention, telephony devices 171, 173, and 175, each represent a plurality of telephony devices at their respective local branches.

VLAN_data 147 is a virtual local area network, configured by software, for handling data from computing device 145, and connected to LAN 129. A VLAN is formed by a group of end stations with a common set of requirements, regardless of their physical location. VLANs have the same attributes as a physical LAN but allow grouping of end stations even if the end stations are not located physically on the same LAN segment.

Routers 131, 133, 135, and 137, provide data and voice transmission routing functions for separate respective local branch locations. Routers 131, 133, 135, and 137, receive information that includes translation of VoIP phone numbers to corresponding mobile device phone numbers for users within each local branch location. The translation information is used by routers 131, 133, 135, and 137, to transfer voice transmissions to a mobile network in response to the local branch location's data network reaching (or in some embodiments of the present invention, approaching) the capacity limit of concurrent voice transmissions. In some embodiments of the present invention, offload transfer program 300 sends the information to each respective router, and in response to determining that the number of active concurrent voice transmissions has reached (or is approaching, in other embodiments) the threshold capacity, offload transfer program 300 initiates transfer of the transmission to an alternate carrier solution.

System monitor 117 is a centralized monitor that collects data and status of VoIP activity on the interconnected local branch networks from each edge device, such as routers 131, 133, 135, and 137, connecting branch LANs to one another through connection to a WAN, for example an Internet connection. System monitor 117 is also connected to session manager 115 which includes the concurrent session maximum (CSM) limit of voice transmissions over the data network, which, in some embodiments of the present invention, is a threshold limit established by an SLA with an SIP bandwidth provider. CSMs are assigned to each of the local branches of an enterprise organization's data network that includes VoIP transmissions. In some embodiments of the present invention, session manager 115 determines whether the active concurrent VoIP sessions reach the CSM or threshold concurrent limit for a given local branch, and sends notification of VoIP sessions reaching threshold capacity to offload transfer program 300, hosted on call processing server 110. System monitor 117, session manager 115, and offload transfer program 300, interactively determine if VoIP concurrent calls reach a bandwidth limitation, based on local branch bandwidth activity and configuration, and transfer additional voice transmission requests to a mobile phone number previously determined to correspond to the VoIP telephone number of the requested voice transmission.

Call processing server 110 is a computing device that includes offload transfer program 300. In some embodiments call processing server 110 may be a management server, a web server, a mobile computing device, or any other electronic device or computing system capable of receiving and sending data. In other embodiments, call processing server 110 may represent a virtual computing device of a computing system utilizing multiple computers as a server system, such as in a cloud computing environment. In another embodiment, call processing server 110 may be a laptop computer, a tablet computer, a netbook computer, a personal computer (PC), a desktop computer, a personal digital assistant (PDA), a smart phone, or any programmable electronic device capable of performing the operational steps of offload transfer program 300, via network 150. In another embodiment, call processing server 110 represents a computing system utilizing clustered computers and components (e.g., database server computers, application server computers, etc.) that act as a single pool of seamless resources when accessed within distributed network processing environment 100. Call processing server 110 may include internal and external hardware components, as depicted and described with reference to FIG. 4.

In some embodiments of the present invention, offload transfer program 300 receives the active concurrent VoIP transmissions data of each local branch from system monitor 117, and receives CSM of VoIP transmissions for each local branch of the enterprise network from session manager 115. Offload transfer program 300 determines if concurrent session activity has reached the CSM for a given local branch, as per a predetermined allocation of bandwidth, and having determined that the threshold limit of sessions has been reached, offloads the requested voice transmission (call) from the local branch data network associated with threshold limit of concurrent session activity, to a mobile phone number corresponding to the telephone extension number of the targeted recipient in the local branch. In other embodiments, session manager 115 determines that the active concurrent sessions of VoIP calls equals the CSM limit, and sends notification to offload transfer program 300.

Offload transfer program 300 includes data that maps the VoIP phone extension of each local branch to a mobile phone number of the user corresponding to the VoIP phone extension. Having determined that a request for a VoIP call exceeds a threshold limit, or the CSM, offload transfer program 300 transfers the requested call to the mobile phone corresponding to the VoIP extension, completing the call by offloading from the data network to a mobile phone network connection.

FIG. 2A is a functional block diagram illustrating router table 205, including exemplary communication bandwidth capacity and current activity data of three branches of distributed communication network environment 100 of FIG. 1, in accordance with an embodiment of the present invention. Router table 205 includes data for location 210 (referring to the column of data below location 210), location 220, and location 230 which, in one embodiment of the present invention, correspond to branch locations of an enterprise organization within distributed communication network environment 100.

Router table 205 includes bandwidth rate data, CSM limits of VoIP concurrent session calls, and concurrent sessions active (CSA) of VoIP calls, indicating the number of concurrent VoIP calls that are currently active, for each of locations 210, 220, and 230. Locations 210 and 220 both have bandwidth of 1.5 MB/s, and location 230 has a lower bandwidth at 1.0 MB/s. Location 210 has a CSM of 15 and a CSA of 7 VoIP sessions, so location 210 is well below the threshold concurrent call level.

Router table 205 depicts location 220 as having 14 concurrent VoIP sessions that are active, with a CSM of 15, indicating that an additional concurrent call request will cause location 220 to reach the concurrent session threshold limit. In some embodiments of the present invention, offload transfer program 300 transfers call requests after the threshold limit of concurrent VoIP calls is reached which, in the case of location 220 would occur after if a call request was received while 15 concurrent sessions were active. In other embodiments of the present invention, a concurrent session limit may be applied that is below the CSM, for example, 13 concurrent VoIP sessions, and avoids a potential decline of data network performance.

Router table 205 depicts location 230 with CSA calls equal to the CSM limit. In some embodiments of the present invention, in response to receiving an additional request for a VoIP call, while the concurrent sessions active are equal to the CSM limit of VoIP calls, offload transfer program 300 transfers the requested call to a mobile phone number corresponding to the VoIP extension to which the call is targeted. For example, location 230 has a CSA of 10 VoIP calls, and a CSM of 10 VoIP calls, and receives a request for an additional VoIP call, concurrent with the CSA of 10 calls. Offload transfer program 300 transfers the requested VoIP call that will exceed the CSM to a mobile phone number that corresponds to the VoIP telephone number of a user to which the requested VoIP call is targeted.

In other embodiments, offload transfer program 300 may transfer the requested call to a corresponding mobile phone number in response to the additional request of a VoIP increasing the concurrent session active calls to equal the CSM limit. For example, if the CSA for location 230 is 9 and an additional VoIP call request is received by location 230, offload transfer program 300 transfers the requested call to a mobile phone number that corresponds to the user to which the requested VoIP call is targeted.

FIG. 2B illustrates exemplary table 255 that includes telephony contact translation information of selected users of distributed communication network environment 100 of FIG. 1, in accordance with an embodiment of the present invention. Table 255 includes contact information for first user 260, second user 270, and third user 280. For each user, table 255 includes the VoIP extension number, a corresponding mobile telephone number for the same user, and in some embodiments of the present invention, a public switched telephone network (PSTN) number, which may be a copper-wire second extension connected to the telephone device supporting a particular VoIP extension number for a particular user. In other embodiments Table 255 may include softphone numbers respectively corresponding to each user listed on table 255 (not shown). For example, first user 260 is depicted as having extension 263, which is an assigned VoIP extension number of "x-3398". Table 255 also depicts first user 260 as having mobile 265, which is a mobile phone number, "987-654-0123", of first user 260's mobile phone, and table 255 shows first user 260 as having a PSTN 267, which is a hard-wired switched telephone connection number of "7-987-565-0001", corresponding to the VoIP extension for first user 260. Similarly, second user 270 and third user 280 have VoIP extensions, mobile phone numbers, and PSTN phone numbers that correspond to each respective user of the telephony system of a local branch of distributed communication network environment 100.

Table 255 is accessible to offload transfer program 300, enabling translation of a received request to set up a VoIP call on a particular extension number to a corresponding mobile phone number or, in some embodiments of the present invention, to a corresponding PSTN phone number. Offload transfer program 300, in response to determining that the local branch concurrent session active calls exceeds a threshold concurrent call limit, re-directs the call request to the mobile phone number corresponding to the VoIP extension number associated with the call setup request or, in other embodiments, offload transfer program 300 redirects the call request to a PSTN number that corresponds to the VoIP extension to which the call request was directed, based on the information included in table 255.

In some embodiments of the present invention, as an alternative to re-directing a call request to another network, such as directing the call to a mobile phone using a mobile network, or re-directing the call to a hard-wired PSTN network, offload transfer program 300 may apply another alternative in which the enterprise business model supports use of lower voice quality transmission during peak usage periods in which the concurrent session active calls exceeds the predetermined threshold concurrent session limit. Instead of re-directing the telephone call to a mobile cell phone during capacity usage, a broadband intern& connection could be used, or a Wi-Fi connection, or an alternative LAN connection, to the particular local branch and negotiate a lower bandwidth codec to an alternate softphone extension on a computer or mobile device. Thus, additional capacity may be attained. The codec negotiation is also applicable to the MPLS scenario.

Embodiments of the present invention include centralized collection of monitoring data of SIP trunks monitored at the branch edge devices of distributed branches of an enterprise organization, connected by a WAN. Embodiments also include logic to direct VoIP call requests to alternate networks based on the monitored data. Initiation of call transfers to alternate networks or negotiated lower bandwidth codec is based on determining whether the concurrent session active calls have reached a predetermined threshold, based on allocated bandwidth of data networks available to the respective branches of the enterprise organization, and grouping of user contact information by branch location.

Figure 3:
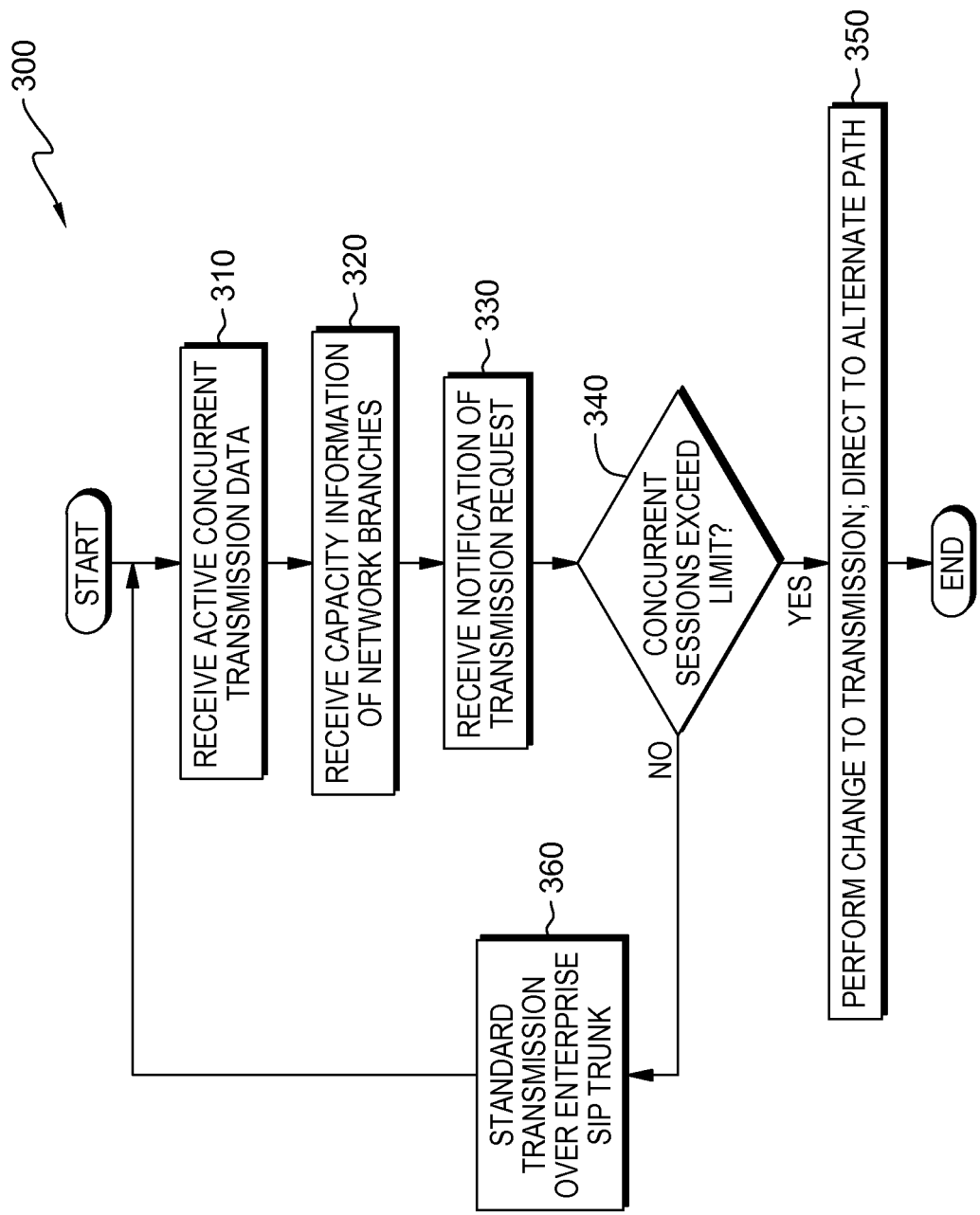
FIG. 3 depicts operational steps of an offload transfer program, operating on a call processing server within the distributed communication network environment of FIG. 1, in accordance with an embodiment of the present invention.

FIG. 3 depicts operational steps of offload transfer program 300, operating on call processing server 110, within distributed communication network environment 100 of FIG. 1, in accordance with an embodiment of the present invention. In step 310, offload transfer program 300 receives active concurrent transmission data. The active transmissions, or calls, are monitored at the branch level of an enterprise organization having multiple branches at dispersed locations, each having LANs connected by a WAN. The monitoring of active calls by edge devices at each branch location is centrally collected and available to a centralized session manager, and offload transfer program 300. In some embodiments session manager 115 sends the monitored data of active calls at each branch location to offload transfer program 300. In other embodiments, offload transfer program 300 accesses and retrieves the active call data from a centralized collection point.

For example, system monitor 117 collects active call data from routers 131, 133, 135, and 137, which includes the respective concurrent session active transmissions for each branch location of an enterprise group within distributed communication network environment 100. Session manager 115 accesses the concurrent session active call data for each branch location and sends the information to offload transfer program 300, which receives the transmission data.

In step 320, offload transfer program 300 receives capacity information of network branches for concurrent active transmissions. In some embodiments of the present invention, the threshold limit of concurrent active call sessions of each branch location is maintained by a session manager, such as session manager 115, and the capacity information of each branch location is sent to offload transfer program 300. The CSM is a predetermined bandwidth allocation limit configured the MPLS bandwidth of the data network for each local branch, and the CSM of each local branch defines the capacity limit of concurrent active transmissions, such as VoIP calls.

For example, session manager 115 sends CSM capacity information of each local branch to offload transfer program 300, which includes the threshold limit of voice transmissions that can concurrently be active.

In step 330, offload transfer program 300 receives notification of a transmission request within a branch location. In some embodiments of the present invention, a request to setup a call within one of the monitored branch locations is determined by the session manager accessing the monitoring of the session monitor. A notification of the request is sent to offload transfer program 300, by the session manager. Offload transfer program 300 has received information regarding the concurrent session active calls, the CSM limits for each branch location within the enterprise organization, and receives notification of an additional call request within a branch location from the session manager.

For example, offload transfer program 300, having received information regarding the active concurrent call sessions for each branch location from the monitored data collected by system monitor 117, and having received the CSM limits for each branch location, from session manager 115, receives notification from session manager 115 of a request to setup a call in one of the branch locations of the enterprise organization within distributed communication network environment 100. Offload transfer program 300 is now in possession of the number of active concurrent calls within each branch, and the threshold number of concurrent calls that are allocated within the bandwidth limits of the data network for each branch location. In response to receiving a call request notification at one of the branch locations, offload transfer program 300 can determine a course of action to take.

In decision step 340, offload transfer program 300 determines whether the concurrent sessions that are active exceed the threshold limit. In response to receiving the notification of a requested call setup, offload transfer program 300 determines which branch location(s) is involved in the requested call setup, and determines if the call, in combination with the concurrent sessions active for the particular branch location, exceeds the CSM limit for that particular branch location. Determining, in step 340, "NO" branch, that the additional call added to active concurrent sessions does not exceed the threshold concurrent limit, offload transfer program 300 enables initiation of a standard transmission over the enterprise SIP trunk (data network) in step 360, and returns to receive monitored concurrent transmission data, in step 310.

In the case of step 340, "YES" branch, in which offload transfer program 300 determines that the additional call request, combined with the concurrent sessions that are active, does exceed the CSM limit for the particular branch location, offload transfer program 300, in step 350, performs a change to the transmission to direct the requested call to an alternate path. In some embodiments of the present invention, offload transfer program 300 directs the transmission to a mobile phone number that corresponds to the user to which the VoIP call is targeted. In other embodiments, offload transfer program 300 directs the transmission to a lower voice quality from degraded codec on the same MPLS.

For example, offload transfer program determines that the addition of a requested call setup to a first branch location will exceed the CSM for that particular branch, and performs a change to the transmission of the requested call using an alternate path. In some embodiments of the present invention, offload transfer program 300 determines the requested call is directed to extension 263, which is number "x-3398", of first user 260. Offload transfer program 300 accesses mobile 265 from table 255, and retrieves the corresponding mobile phone number for first user 260. Offload transfer program transfers the call to phone number "987-654-0123", which corresponds to mobile 265. Thus the SIP trunk utilizing the data network for voice transmissions does not exceed the CSM, because the requested call is alternatively directed to the mobile phone number, using the mobile network of first user 260.

In another embodiment of the present invention, offload transfer program 300 may negotiate a lower voice quality level by codec negotiation, which reduces bandwidth requirement by further compression of the analog to digital signal of the audio transmission. Calls made using the negotiated lower quality level codec consume less bandwidth of the SIP trunk per call and therefore additional calls are accommodated within the same SIP trunk bandwidth limits. Embodiment using a lower voice quality level codec may involve designating such options in a service level agreement (SLA) of a provider of SIP trunk bandwidth. In yet other embodiments, offload transfer program 300 directs the requested call to the PSTN network, determining the corresponding hard-wire connection number "7-987-565-0003" to correspond to extension 263 VoIP number of "x-3398" for first user 260.

Having performed a change to routing the transmission, and initiated the requested call within the branch location at the CSM limit of voice transmissions, without loss of service, offload transfer program 300 ends.

Figure 4:
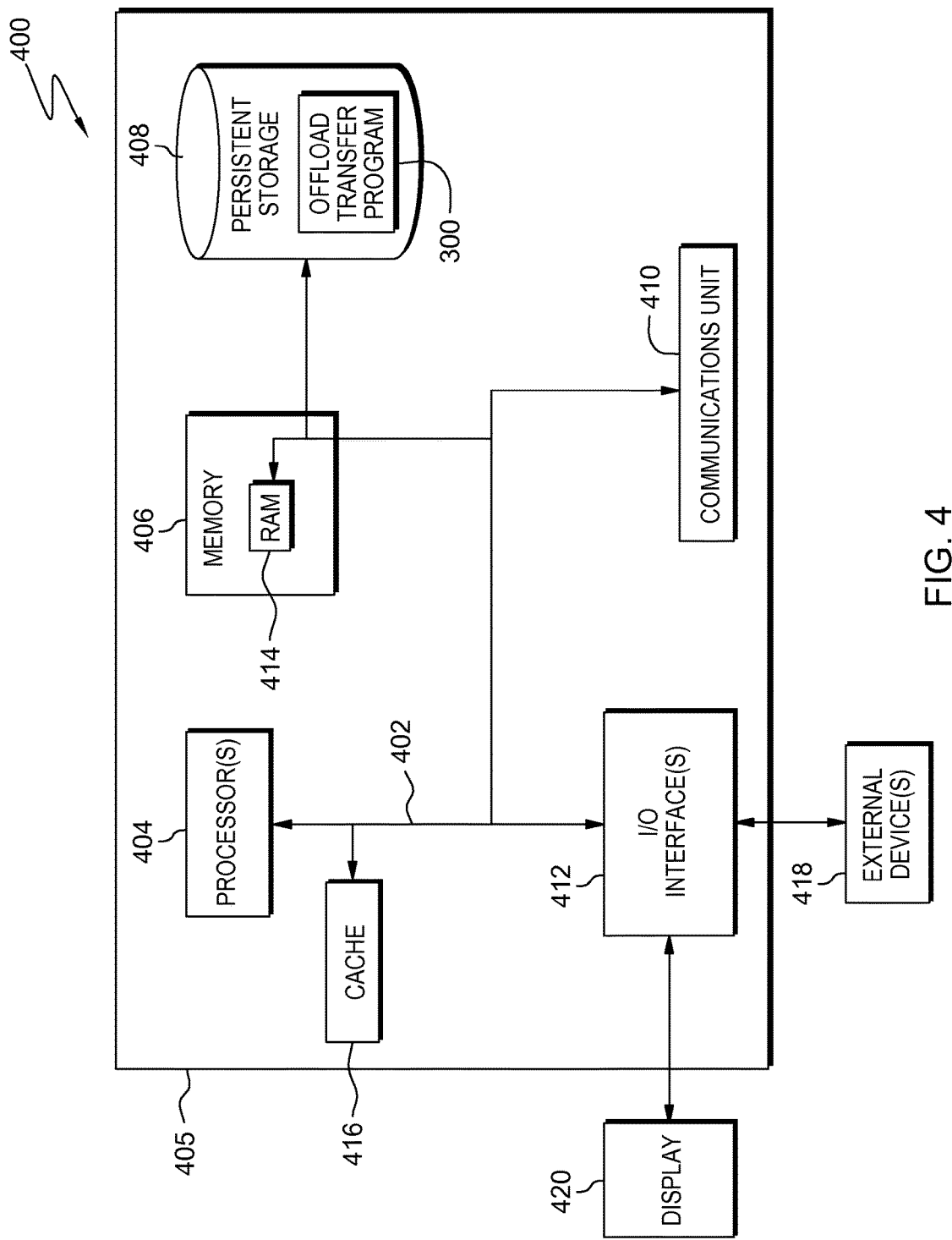
FIG. 4 depicts a block diagram of components of a call processing server capable of operationally performing the transfer-to-mobile program, in accordance with an embodiment of the present invention.

FIG. 4 depicts a block diagram of components of computing system 400, including computing device 405 which, similar to call processing server 110, is capable of operationally performing offload transfer program 300, in accordance with an embodiment of the present invention.

Computing device 405, includes components and functional capability similar to call processing server 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Offload transfer program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed communication network environment 100 and computing devices 141, 143, and 145, and call processing server 110. In these examples, communications unit 410 includes one or more network interface cards. Communications unit 410 may provide communications through the use of either or both physical and wireless communications links. Offload transfer program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., offload transfer program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transferring transmissions of a voice over Internet protocol (VOIP) data network, the method comprising:
    receiving, by one or more processors, metrics of active concurrent transmission sessions on a local area network (LAN) that includes a data network, the LAN connected to a wide area network, and receiving a maximum threshold level of concurrent transmission sessions of the data network of the LAN;
    detecting, by one or more processors, a request for an additional transmission session on the data network of the LAN directed to a targeted recipient by a connection number of the data network; and
    responsive to determining, by one or more processors, whether a combination of the additional transmission session and the active concurrent transmission sessions within the data network of the LAN, exceed the maximum threshold level of concurrent transmission sessions for the data network of the LAN:
        accessing, by one or more processors, data that maps the connection number of the data network of the LAN for the targeted recipient to a connection number of an alternate network corresponding to the targeted recipient, wherein the connection number of the alternate network and the connection number of the data network of the LAN are distinct;
        transferring, by one or more processors, the additional transmission session from the connection number of the data network of the LAN for the targeted recipient to the connection number of the alternate network corresponding to the targeted recipient.

2. The method of claim 1, wherein the active concurrent transmission sessions and the additional transmission session are voice-over-IP transmissions, and the data network is a session initiation protocol network.

3. The method of claim 1, wherein the completion of the additional transmission session by the connection number of the data network of the LAN is made by use of a voice-over-IP phone number, and the connection number of the alternate network is made by use of a mobile telephone number, which is mapped to the voice-over-IP phone number, and the connection number of the alternate network is mapped to the connection number of the data network of the LAN.

4. The method of claim 1, wherein the request for an additional transmission session is transferred to a phone number of a mobile phone which is mapped to a voice-over-IP telephone number of the targeted recipient of the data network of the LAN.

5. The method of claim 1, wherein the additional transmission session is included within the active concurrent transmission sessions of the data network of the LAN by a negotiation of the additional transmission session to use a lower quality level codec, wherein the additional transmission session using the lower quality level codec requires less bandwidth due to increased compression of the additional transmission session by the lower quality level codec.

6. The method of claim 1, wherein transfer of the additional transmission session from the connection number of the data network of the LAN for the targeted recipient, to the connection number of the alternate network corresponding to the targeted recipient, includes transferring the additional transmission session from the data network of the LAN to a public switched telephone network.

7. A computer program product for transferring transmissions of a voice over Internet protocol (VOIP) data network, the computer program product comprising:
    one or more computer readable storage media wherein the computer readable storage medium is not a transitory signal per se, and program instructions stored on the one or more computer readable storage media, the program instructions comprising:
    program instructions to receive metrics of active concurrent transmission sessions on a local area network (LAN) that includes a data network, the LAN connected to a wide area network, and receive a maximum threshold level of concurrent transmission sessions of the data network of the LAN;
    program instructions to detect a request for an additional transmission session on the data network of the LAN directed to a targeted recipient by a connection number of the data network; and responsive to determining whether a combination of the additional transmission session and the active concurrent transmission sessions within the data network of the LAN, exceed the maximum threshold level of concurrent transmission sessions for the data network of the LAN:

program instructions to access data that maps the connection number of the data network of the LAN for the targeted recipient to a connection number of an alternate network corresponding to the targeted recipient, wherein the connection number of the alternate network and the connection number of the data network of the LAN are distinct;

program instructions to transfer the additional transmission session from the connection number of the data network of the LAN for the targeted recipient to the connection number of the alternate network corresponding to the targeted recipient.

8. The computer program product of claim 7, wherein the active concurrent transmission sessions and the additional transmission session are voice-over-IP transmissions, and the data network is a session initiation protocol network.

9. The computer program product of claim 7, wherein program instructions to complete the additional transmission session by the connection number of the data network of the LAN is made by use of a voice-over-IP phone number, and the connection number of the alternate network is made by use of a mobile telephone number, which is mapped to the voice-over-IP phone number, and the connection number of the alternate network is mapped to the connection number of the data network of the LAN.

10. The computer program product of claim 7, wherein, program instructions to determine whether the additional transmission session results in active concurrent transmission sessions that exceed the threshold level of concurrent transmission sessions of the data network of the LAN, further comprises:

program instructions to determine whether a combination of the request for an additional transmission session and the active concurrent transmission sessions within the data network of the LAN, exceed the maximum level of concurrent transmission sessions.

11. The computer program product of claim 7, wherein the program instructions to receive the request for an additional transmission session transfers the received request to a phone number of a mobile phone, which is mapped to a voice-over-IP telephone number of the targeted recipient of the data network of the LAN.

12. The computer program product of claim 7, wherein the additional transmission session is included within the active concurrent transmission sessions of the data network of the LAN by a negotiation of the additional transmission session to use a lower quality level codec, wherein the additional transmission session using the lower quality level codec requires less bandwidth due to increased compression of the additional transmission session by the lower quality level codec.

13. The computer program product of claim 7, wherein program instructions for transfer of the additional transmission session from the connection number of the data network of the LAN for the targeted recipient, to the alternate network corresponding to the targeted recipient, includes program instructions to transfer the additional transmission session from the data network of the LAN to a public switched telephone network.

14. A computer system for transferring transmissions of a voice over Internet protocol (VOIP) data network, the computer system comprising:

one or more computer processors, one or more computer readable storage media, program instructions stored on the computer readable storage media for execution by at least one of the one or more processors, the program instructions comprising:

program instructions to receive metrics of active concurrent transmission sessions on a local area network (LAN) that includes a data network, the LAN connected to a wide area network, and receive a maximum threshold level of concurrent transmission sessions of the data network of the LAN;

program instructions to detect a request for an additional transmission session on the data network of the LAN directed to a targeted recipient by a connection number of the data network; and responsive to determining whether a combination of the additional transmission session and the active concurrent transmission sessions within the data network of the LAN, exceed the maximum threshold level of concurrent transmission sessions for the data network of the LAN:

program instructions to access data that maps the connection number of the data network of the LAN for the targeted recipient to a connection number of an alternate network corresponding to the targeted recipient, wherein the connection number of the alternate network and the connection number of the data network of the LAN are distinct;

program instructions to transfer the additional transmission session from the connection number of the data network of the LAN for the targeted recipient to the connection number of the alternate network corresponding to the targeted recipient.

15. The computer system of claim 14, wherein the active concurrent transmission sessions and the additional transmission session are voice-over-IP transmissions, and the data network is a session initiation protocol network.

16. The computer system of claim 14, wherein, program instructions to determine whether the additional transmission session results in active concurrent transmission sessions that exceed the threshold level of concurrent transmission sessions of the data network of the LAN, comprises:

program instructions to determine whether a combination of the request for an additional transmission session and the active concurrent transmission sessions within the data network of the LAN, exceed the threshold level of concurrent transmission sessions.

17. The computer system of claim 14, wherein the program instructions to receive the request for an additional transmission session transfers the received request to a phone number of a mobile phone, which is mapped to a voice-over-IP telephone number of the targeted recipient of the data network of the LAN.

18. The computer system of claim 14, wherein the additional transmission session is included within the active concurrent transmission sessions of the data network of the LAN by a negotiation of the additional transmission session to use a lower quality level codec, wherein the additional transmission session using the lower quality level codec requires less bandwidth due to increased compression of the additional transmission session by the lower quality level codec.

19. The computer system of claim 14, wherein program instructions for transfer of the additional transmission session from the connection number of the data network of the LAN for the targeted recipient, to the alternate network corresponding to the targeted recipient, includes program instructions to transfer the additional transmission session from the data network of the LAN to a public switched telephone network.

\* \* \* \* \*